US009404413B2

(12) United States Patent
Schmalzing et al.

(10) Patent No.: US 9,404,413 B2
(45) Date of Patent: Aug. 2, 2016

(54) INTERNAL COMBUSTION MACHINE, WATER CRAFT, AND METHOD FOR OPERATING THE POWER SUPPLY SYSTEM OF A SHIP USING AN INTERNAL COMBUSTION ENGINE

(75) Inventors: Claus-Oliver Schmalzing, Bad Waldsee (DE); Holger Frank, Friedrichshafen (DE); Philippe Gorse, Friedrichshafen (DE); Peter Riegger, Uberlingen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 242 days.

(21) Appl. No.: 14/232,120

(22) PCT Filed: Jul. 10, 2012

(86) PCT No.: PCT/EP2012/002907
§ 371 (c)(1),
(2), (4) Date: Apr. 15, 2014

(87) PCT Pub. No.: WO2013/007378
PCT Pub. Date: Jan. 17, 2013

(65) Prior Publication Data
US 2014/0230435 A1 Aug. 21, 2014

(30) Foreign Application Priority Data
Jul. 12, 2011 (DE) .......................... 10 2011 079 036

(51) Int. Cl.
*F02B 33/44* (2006.01)
*F02B 33/00* (2006.01)
(Continued)

(52) U.S. Cl.
CPC . *F02B 33/40* (2013.01); *B60K 6/48* (2013.01); *B63H 21/20* (2013.01); *B63H 23/10* (2013.01);
(Continued)

(58) Field of Classification Search
CPC .......... F02B 37/10; F02B 37/04; F02B 37/20; F02B 33/40; B60K 6/48; B63H 1/20; B63H 23/10
USPC ..................................... 60/607–608
See application file for complete search history.

(56) References Cited

U.S. PATENT DOCUMENTS 3,048,005 A * 8/1962 Egli ....................... F02B 37/11
60/608
6,408,626 B1 * 6/2002 Arnell ..................... F02B 37/04
60/607

(Continued)

FOREIGN PATENT DOCUMENTS

DE 10203309 A1 7/2003
DE 10315148 A1 11/2004
(Continued)

OTHER PUBLICATIONS

English Language Abstract for DE 10203309.
(Continued)

*Primary Examiner* — Thai Ba Trieu
*Assistant Examiner* — Ngoc T Nguyen
(74) *Attorney, Agent, or Firm* — Reising Ethington, P.C.

(57) ABSTRACT

The invention relates to an internal combustion machine (10), comprising a combustion engine (1) having an exhaust gas side (AGS) and a charging fluid side (LLS), and having a supercharger system (14) comprising an exhaust gas turbo charger (40) for charging the combustion engine (1), having a condenser array (41) on the charging fluid side (LLS) and a turbine arrangement (42) on the exhaust gas side (AGS), a compressor (3), the primary side (I) of which is connected to the charging fluid side (LLS), and the secondary side (II) of which is connected to the exhaust gas side (AGS). An electric machine (4) configured as a motor/generator is coupled to the combustion engine (1), wherein the electric machine (4) as a generator can be powered by the combustion engine (1), or can power the combustion engine (1) as a motor, wherein the compressor (3) can be powered directly by the electric machine (4) via a mechanical drive coupling (13).

19 Claims, 3 Drawing Sheets

(51) Int. Cl.
- *F02B 33/40* (2006.01)
- *B60K 6/48* (2007.10)
- *B63H 21/20* (2006.01)
- *F02B 37/04* (2006.01)
- *F02B 37/10* (2006.01)
- *F02B 37/20* (2006.01)
- *B63J 3/02* (2006.01)
- *B63H 23/10* (2006.01)
- *B63H 23/18* (2006.01)
- *B63H 23/14* (2006.01)
- *B63J 3/00* (2006.01)

(52) U.S. Cl.
CPC . *B63J 3/02* (2013.01); *F02B 37/04* (2013.01); *F02B 37/10* (2013.01); *F02B 37/20* (2013.01); *B60K 2006/4808* (2013.01); *B60Y 2400/435* (2013.01); *B63H 23/14* (2013.01); *B63H 23/18* (2013.01); *B63H 2021/205* (2013.01); *B63J 2003/005* (2013.01); *Y02T 10/144* (2013.01); *Y02T 10/626* (2013.01); *Y02T 10/6221* (2013.01); *Y02T 70/5236* (2013.01)

(56) References Cited

U.S. PATENT DOCUMENTS

| | | | |
|---|---|---|---|
| 2006/0064981 | A1* | 3/2006 | Kojima ............ F02B 37/04 60/612 |
| 2009/0107739 | A1 | 4/2009 | Major et al. |
| 2011/0214422 | A1* | 9/2011 | VanDyne ......... F02B 37/10 60/607 |
| 2012/0117962 | A1* | 5/2012 | VanDyne ......... F02B 37/20 60/600 |
| 2012/0137681 | A1 | 6/2012 | Hoess et al. |

FOREIGN PATENT DOCUMENTS

| | | |
|---|---|---|
| DE | 102006059664 A1 | 7/2007 |
| DE | 102006027865 A1 | 12/2007 |
| DE | 102009034510 A1 | 4/2011 |
| FR | 2962507 A1 * | 1/2012 .......... F02B 37/04 |

OTHER PUBLICATIONS

English Language Abstract for DE10315148.
English Language Abstract for DE 102006059664.
International Search Report dated Feb. 21, 2013 for PCT/EP2012/002907.

* cited by examiner

- RRSS slope (start-up to NLP)
- RRSS slope (sport fishing mode)

INTERNAL COMBUSTION MACHINE, WATER CRAFT, AND METHOD FOR OPERATING THE POWER SUPPLY SYSTEM OF A SHIP USING AN INTERNAL COMBUSTION ENGINE

CROSS REFERENCE TO RELATED APPLICATIONS

This application is a National Phase Application related to PCT/EP2012/002907 filed on Jul. 10, 2012, which application claims priority to DE 10 2011 079 036.5 filed on Jul. 12, 2011, which applications are incorporated herein by reference in their entireties.

TECHNICAL FIELD

The present disclosure generally relates to an internal combustion engine. In addition, the present disclosure relates to a watercraft and to a method for the operation of a watercraft power supply using an internal combustion engine.

BACKGROUND

An internal combustion engine of the type named above is described in DE 103 15 148 A1. In a suitable valve position, the air required by the supercharger in an internal combustion engine as named above can be fed to the turbine of the exhaust gas turbocharger. By means of this measure, a more spontaneous response is achieved in the transition from idle to a higher load output.

Other approaches for a supercharger-supported turbocharging are found in, by way of example, DE 33 17 017 A1, DE 42 10 070 C1, or GB 21 21 474 A; however, these approaches do not enable a spontaneous response in the transition from idle to a higher load output.

Moreover, a comparably high flexibility and/or dynamic behavior with which the spontaneous response can be made available is also desirable, in addition to a more spontaneous response in the transition from idle to a higher load output. On this point, the measures to-date are wanting of improvement. This is true in general both for a single-stage and a two-stage charging of a combustion engine. As such, the measures named in DE 198 37 978 A1 and GB 21 21 474 A are quite insufficient, because they only enable a comparably sluggish reaction of an internal combustion engine to a performance demand in cases where a highly-flexible and spontaneous response is needed in the transition from idle to a higher load output.

A fully different concept can be found in U.S. Pat. No. 6,840,045 B2, by way of example, which focuses on providing an internal combustion engine with a wide spectrum of rotation speeds, while expressly accepting a rather sluggish response. This document fundamentally suggests operating a first electric machine in the form of a motor/generator with an engine rotation speed of the internal combustion engine, and coupling this first electric machine to a second motor/generator which is connected to the axle of a turbocharger. This enables, depending on the rotation speed of the internal combustion engine, an operation of the second motor/generator either as a generator—at low rotation speed—or as a motor—at high rotation speed of the internal combustion engine. At high rotation speeds of the internal combustion engine, the additionally generated electrical power of the second motor/generator can therefore be coupled back to the internal combustion engine together with the power of the first motor/generator, in order to achieve a still higher overall output. A similar concept is described in WO 2008/079180 A1.

However, such concepts do not contribute to increasing, in a targeted manner, a spontaneous response of the internal combustion engine. Rather, such concepts—for example, as described in general in DE 10 2007 010 027 A1, serve to provide a first approach for a hybrid drive. In DE 10 2007 010 027 A1, a drivetrain is described for this purpose, having a combustion engine and an electric machine in the form of a motor generator which rotates at the engine rotation speed. This motor/generator is coupled via a control device to both a second electric machine which is designed as a motor for the purpose of driving a compressor, and a third electric machine which is driven by a turbine in the exhaust gas flow as a generator. The electrical energy needed to drive the second electric machine is fed from the third electric machine to the second electric machine, in a manner controlled by the electronics. As such, an optimum operation point for the operation of the compressor is generally always available for the second electric machine. For the event that the third electric machine supplies more electrical energy than is needed by the second electric machine at a given point in time, the same can be used to operate the first electric machine designed as a motor/generator—meaning for so-called electric boosting. As an alternative or in addition thereto, the electrical energy can also be saved in an energy storage device. A redistribution of the power available, between the electric machines, by means of a controller, is comparatively difficult and does not contribute to a spontaneous response of the combustion engine.

The exemplary illustrations proceed from this point, and address the problem of providing an internal combustion engine of the type named above, as well as a watercraft, and a method for the operation of a watercraft power supply network using an internal combustion engine, wherein not only is the spontaneous response in the transition from idle to a higher load output improved, but also the flexible availability of the spontaneous response is improved. In particular, the spontaneous response should be available at a comparably high clock rate.

The problem with respect to the internal combustion engine is addressed by an internal combustion engine of the type named above, for example as described further below in regard to the exemplary illustrations.

SUMMARY

According to the exemplary illustrations provided herein, an electric machine designed as a motor/generator is included for this purpose, to enhance the internal combustion engine as named above, and is coupled to the combustion engine. In other words, the motor/generator may be coupled to the crankshaft of the combustion engine, and particularly rotates at the rotation speed of the combustion engine. The electric machine which is advantageously designed in this manner can be driven as a generator by the combustion engine, particularly by the crankshaft thereof, or can drive, as a motor, the combustion engine, particularly the crankshaft thereof. The exemplary illustrations also involve the supercharger being able to be driven directly by the electric machine via a mechanical drive coupling. In other words, the electric machine, particularly as a motor, can directly drive the supercharger via a mechanical drive coupling. Expressed in another way, according to the concept of some exemplary illustrations, in contrast to the prior art, the drive power of an electric machine designed as a motor/generator is made available to the supercharger essentially with no transmission loss—and particularly no time loss as well. In particular, the power of the electric machine designed as a motor/generator is made available to the supercharger, in each case in one possible operating mode, without intermediate storage of the power, particularly without intermediate storage of electrical energy.

This operating mode is advantageously designed as a so-called interval mode, by means of which it is possible to make the power of the electric machine designed as a motor/generator available in repeating time intervals in a manner directly driving the supercharger.

The exemplary illustrations are also directed to a watercraft of the type named above, having an internal combustion engine according to the concept of the exemplary illustrations, wherein in an interval mode, with repeating time intervals, the supercharger can be driven directly by the electric machine via a mechanical drive coupling. This interval mode is particularly advantageous, merely by way of example, for sport fishing, wherein the watercraft must respond spontaneously in repeating time intervals in order to achieve a transition from idle to operation at a comparably high load output. The comparably high load output, however, is most often significantly below a normal load operation, but can be expanded when needed up to a full-load operation. The comparably high load output may lie in a range between 40 and 60% of the full-load operation, and in another example in a range between 40 and 60% of the normal load operation—as measured by the engine rotation speed or the torque.

The internal combustion engine may be designed to carry out a method according to the exemplary illustrations described herein. The exemplary approaches lead to a corresponding method for the operation of a watercraft power supply network using an internal combustion engine of the type described above. The method has a plurality of operating modes according to the exemplary illustrations, as follows: Starter mode, generator mode, electroboost mode, silent-running mode, and interval mode.

The starter mode in this case may be designed in such a manner that the combustion engine is driven by the electric machine. This mode therefore corresponds to a known starter behavior, wherein the electric machine, as a motor, drives and starts the combustion engine. The electric machine can be driven for this purpose from a battery.

In contrast, the generator mode is designed in such a manner that the electric machine is driven by the combustion engine. In this case, the electric machine can produce current, as a generator, and the current can be used in many ways, including for the on-board power.

The electroboost mode is designed in such a manner that the electric machine and the combustion engine drive a propeller. In this case, a particularly high drive power is made available to the propeller with a comparably high response—particularly by the electric machine and by the combustion engine.

The silent-running mode may be designed in such a manner that only the electric machine drives a propeller. This operating mode is particularly low-noise, and is suitable, by way of example, for maneuvering a watercraft when in harbor. In particular, the combustion engine and the supercharger do not supply any drive power to the propeller, for this purpose.

According to the exemplary illustrations, the method for the operating of a watercraft power supply network also has the interval mode named above. The interval mode is designed in such a manner that the combustion engine drives a propeller, and the electric machine drives the supercharger in repeating time intervals.

It has been shown that the supercharger drive via the electric machine in fact makes it possible to increase a rotation speed and/or torque output of the combustion engine from idle to a comparably high power range in comparably short—and moreover, also high-frequency—time intervals. As a result of the concept of directly driving the supercharger by means of the electric machine via a mechanical drive coupling, a particularly spontaneous response results in the transition from idle to a comparably high load output, which can also be repeated at a high clock rate.

Advantageous implementations of the exemplary illustration are found in the dependent claims, and give detailed advantageous possibilities of realizing the concept explained above in the context of the problem presentation, and also as far as further advantages are concerned.

It has proven particularly advantageous for some applications that the supercharger can be driven directly by the electric machine clocked in chronologically limited time intervals. The time intervals may be less than 10 minutes; but can be substantially smaller, independently thereof, and in some examples may be advantageously less than one minute, and in another exemplary approach may be less than 30 seconds. With regards to time intervals of this size, it has proven advantageous to operate the internal combustion engine in a watercraft in an interval mode as named above, such that the watercraft can be used in a particularly advantageous manner for sport fishing.

In an interval mode, the supercharger may be driven directly by the electric machine via a mechanical drive coupling, wherein in a particularly advantageous manner, the electric machine is driven by a battery. In this way, the supply of current of the electric machine is ensured. As such, the spontaneous and highly-flexible response of the combustion engine, the same being able to be supplied additionally with high power via the supercharger, is ensured.

It has been shown that in an interval mode, the propeller can be driven at a rotation speed of the internal combustion engine in a rotation speed range above 300 rotations per minute, up to 1600 U/min. (RPM). As an alternative or in addition thereto, a torque for the interval mode can be available in a torque range between 500 and 3000 Newton-meters (Nm).

In the context of one exemplary implementation of the method, it is possible to operate the internal combustion engine in the interval mode in a time interval as named above, with at least one slope between a lower rotation speed threshold and an upper rotation speed threshold, in the rotation speed range. The lower rotation speed threshold advantageously lies at the idle operation, or slightly above the same. As an alternative or in addition thereto, it is possible to travel at least one slope between a lower rotation speed threshold and an upper rotation speed threshold in the named torque range. The lower torque threshold is advantageously at an idle operation.

An interval mode as named above can advantageously be carried out, by way of example, directly via a mode button actuation of the controller. In addition, in the interval mode, the supercharger can be actively activated by human interaction. As an alternative or in addition thereto, the interval mode can also be initiated via a deficiency in charge air and/or a speed selection. In the two latter cases, the interval mode may be indirectly initiated via the activation of the supercharger drive.

The connection of the electric machine designed as a motor/generator to the drivetrain can be realized in a fundamentally different manner. The direct coupling of the supercharger to the electric machine via the mechanical drive coupling may be particularly advantageous. The mechanical drive coupling advantageously may have a gearing. The gearing may be formed by means of a motor gearing and/or a mechanical compressor. A driveshaft of the supercharger may be advantageously coupled to the drive coupling on the output end, and a driveshaft of the electric machine may be advantageously coupled on the input end. This design of a mechanical drive coupling applies particularly to a motor function of the electric machine.

The mechanical drive coupling may have an additional propeller gearing. A driveshaft of the propeller may advantageously be coupled to the propeller gearing on the output end and a driveshaft of the electric machine may advantageously be coupled on the input end.

In the context of one exemplary illustration, a driveshaft of the supercharger is coupled to the motor gearing on the output end, and a crankshaft of the combustion engine is simultaneously coupled thereto. As an alternative or in addition thereto, a driveshaft of the propeller and a crankshaft of the combustion engine may be simultaneously coupled to the propeller gearing on the output end.

The mechanical drive coupling named above, or one of the implementations, has proven to be a particularly advantageous option for operating the electric machine as a motor. In motor operation, the electric machine may take on the function of a starter and/or an electric drive. In another operating mode, the electric machine can be operated as a generator. In generator operation, the electric machine may take on the function of a current generator for an on-board power supply and/or a battery.

Exemplary illustrations are now described below with reference to the drawings. This is not necessarily intended to show the exemplary illustrations at scale; rather, the drawings, where it serves the purpose of explaining the exemplary illustrations, are given in a schematic and/or slightly distorted form. As regards expansions of the teachings which can be recognized directly from the drawing, reference is hereby made to the relevant prior art. Here, it must be taken into account that numerous modifications and alterations regarding the form and the detail of an exemplary approach can be undertaken without deviating from the general idea of the exemplary illustrations. The features of the exemplary illustrations disclosed in the description, in the drawing, and in the claims can be essential for the implementation of the exemplary illustrations either individually or in any and all combinations thereof. In addition, all combinations of at least two of the features disclosed in the description, the drawing, and/or the claims fall within the scope of the exemplary illustrations. The general ideas are not restricted to the exact form or the detail of the particular examples shown and described below, or limited to a subject matter which would be restricted in comparison to the subject matter claimed in the claims. Where size ranges are provided, values which lie within the named boundaries should also be taken as boundaries, and can be applied and claimed in any and all manners. For reasons of simplicity, the same reference numbers are used below for identical or similar parts, or parts with identical or similar functions.

BRIEF DESCRIPTION OF THE DRAWINGS

Additional advantages, features, and details of the exemplary illustrations are found in the following description of the exemplary illustrations, and with reference to the drawings, wherein.

DETAILED DESCRIPTION

Figure 1:
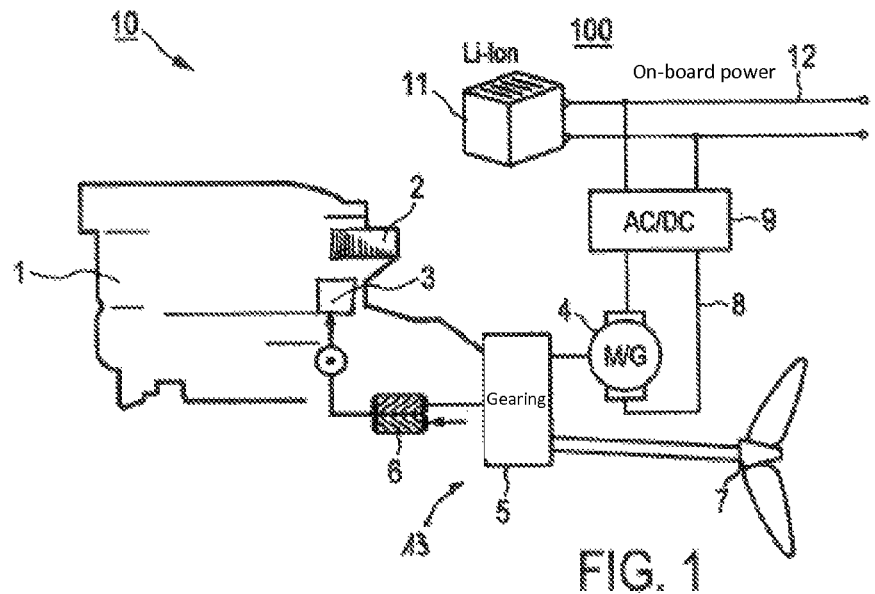
FIG. 1 shows a schematic-symbolic illustration of a watercraft having an internal combustion engine, as well as the peripheral equipment of a watercraft power supply and a propeller for a watercraft, according to one exemplary illustration.

FIG. 1 shows a schematic watercraft 100 having an internal combustion engine 10 which has a combustion engine 1, an exhaust gas turbocharger 2, a supercharger 3, and an electric machine 4 designed as a motor/generator. The electric machine 4 may be operated at the engine rotation speed of the combustion engine 1, and is connected to the same, as well as to the supercharger 3 according to this exemplary illustration, via a mechanical drive coupling 13, which in the present case is a mechanical gearing 5 and a mechanical compressor 6. The gearing 5 also serves the purpose of driving a propeller 7 of the watercraft 100. The electric machine 4 is also designed to supply current to the watercraft 100 via a power supply network 8 and an AC/DC converter 9. Among other devices, a battery 11, which in this case is in the form of a lithium ion battery, and the on-board power supply 12, are connected to the power supply network 8.

Figure 2:
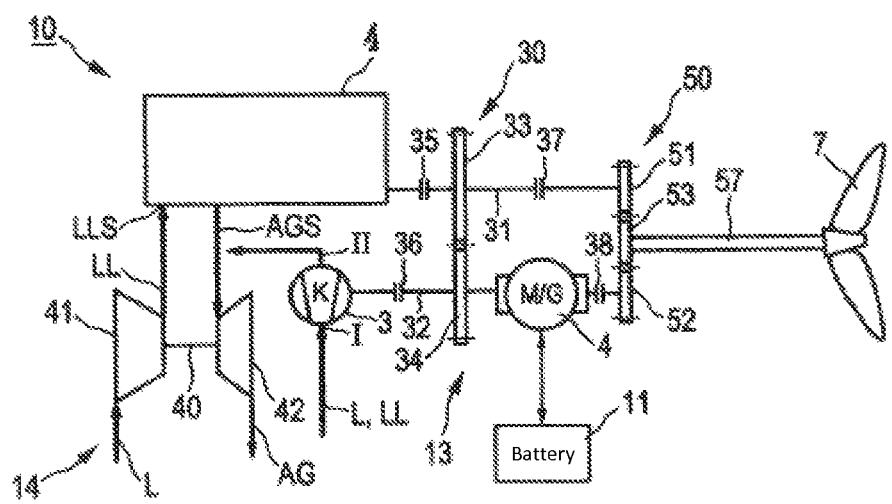
FIG. 2 shows a schematic illustration of an internal combustion engine for an exemplary illustration of FIG. 1.

FIG. 2 shows the schematic construction of the internal combustion engine 10, from which the mechanical drive coupling 13 of the electric machine 4 and the supercharger 3, in particular, as well as the propeller 7 and the combustion engine 1, can be seen. The internal combustion engine 10 in this case is charged by a single-stage charging system 14, which is illustrated in an exemplary manner.

The charging system 14 in this case has a single-stage turbocharger 40 with a compressor 41 coupled via a turbocharger axle, and a turbine 42. Fresh air L is taken in via the compressor 41, and is fed as charge air LL to the charge air end LLS of the combustion engine 1 for the purpose of charging the same. The compressor 41 is driven by the turbine 42 via an axle which is not shown in greater detail. For this purpose, the exhaust gas AG taken from the exhaust end AGS of the combustion engine 1 is fed to the turbine 42, and is then fed to an exhaust gas treatment system, which is not shown in greater detail, while driving the turbine 42. The supercharger 3 has a primary end I and a secondary end II. The primary end I of the supercharger 3 is connected to the charger fluid end LLS of the combustion engine 1, in a manner which is not shown in greater detail. In the present case, fresh air L is supplied to the supercharger 3—in the case of a two-stage charging, charge air LL could also be supplied to the supercharger 3 from the first charging stage. In the present case, the fresh air L compressed by the supercharger 3 is supplied to the exhaust end AGS of the combustion engine 1 in highly-compressed form by the secondary end II of the supercharger 3. In the present case, the air compressed by the supercharger 3 is made available prior to an inlet of the turbine 42, as viewed in the downstream direction of the exhaust gas. In this way, the turbine 42 is driven by the exhaust gases AG taken from the combustion engine 1, and by the air compressed by the supercharger 3.

This measure has proven very effective for achieving a more spontaneous response from the combustion engine 1 starting from idle and rising to a higher load.

The supercharger 3 in the present case may also be directly driven via a mechanical drive coupling 13 which is designed in a particularly advantageous manner for this purpose. In the present case, this enables a direct mechanical drive of the supercharger 3 by the electric machine 4—meaning with a comparably high performance. In order to ensure this, the electric machine 4 is operated as a motor by the output of a charged battery 11.

In addition, the electric machine can be operated in this way in a so-called interval mode, which is described further below. The concept of the mechanical drive coupling 13 not only offers a highly-efficient, but also flexible drive system for the supercharger 3, said drive system being available in intervals and with comparably high clocking rates. The supercharger 3 is therefore capable of spontaneously and flexibly compressing fresh air L (or optionally charge air LL) at high performance, and injecting the same prior to the turbine 42. The acceleration of the exhaust gas turbocharger 40, and therefore the combustion engine 1, achieved in this way, is significantly improved in the amplitude thereof and in the dynamic availability thereof.

In the present case, the mechanical drive coupling 13 has a motor gearing 30. In said gearing, a first gearwheel 33 of a first drivetrain 31 between the combustion engine 1 and the propeller 7 is coupled to a second gearwheel 34 of a second drivetrain 32 between the supercharger 3 and the electric machine 4. The combustion engine 1 is designed to drive the first gearwheel 33 by means of its crankshaft, via a coupling 35 of the first power train 31. A corresponding torque can be relayed via the second gearwheel 34 and a further coupling 36 to the supercharger 3, in order to also provide improved charging by means of the supercharger 3 even during normal operation of the combustion engine 1.

In addition, the electric machine 4 is designed for the purpose of additionally driving the supercharger 3, or driving the same alone, in repeating time intervals, via the second power train 32 and the coupling 36—wherein the electric machine [4] itself is driven via a battery 11. The combustion engine 1 can therefore receive massive acceleration which is available in comparably short time intervals and with comparably high clocking rates.

This output can be applied to the propeller gearing 50 via a further coupling 37, via the first drivetrain 31 and a gearwheel 51. The propeller gearing 50 also has a further gearwheel 53 of the propeller shaft 57.

A starter mode and generator mode of the electric machine 4 are explained with reference to FIG. 1. An electroboost mode and a silent-running mode for an electric machine 4 are explained with reference to FIG. 2 as follows. The propeller gearing 50 can be driven, for example in an electroboost mode, additionally—or, for example in a silent-running mode, alone—by the electric machine 4. For this purpose, the second drivetrain 32 has a further coupling 38 to a further gearwheel 52 of the propeller gearing 50. The further gearwheel 53 of the propeller shaft 57 can therefore be driven alone by the combustion engine 1, alone by the electric machine 4, or by both.

In addition, in an interval mode, the combustion engine 1 can drive the propeller 7, and then—proceeding therefrom—the electric machine 4 can drive the supercharger 3 in repeating time intervals. The latter leads to engine accelerations which are narrowly delimited in time and which can be adjustable with high clock rates, said accelerations being able to be directly applied to the propeller 7. An interval mode for the purpose of operating a watercraft power supply using an internal combustion engine 10 of the type explained above is illustrated according to the concept of the exemplary illustrations with reference to FIG. 3.

When idling, the combustion engine 1 supplies an engine rotation speed in the range of approximately 500 U/min. By way of example, in sport fishing, it has proven indispensable for the combustion engine 1 to be operated not only at comparably high rotation speeds, but also at rotation speeds lying below the nominal load operation. In addition, comparably high torques which are nonetheless significantly below a rotation speed limit should be available at a high clock rate. Accordingly, a rotation speed-limited torque is applied over the engine rotation speed on the characteristic curve a1 in view A of FIG. 3. In view B of FIG. 3, an associated nominal load or full-load operation is illustrated as curve b1 over the engine rotation speed in profile over time.

Figure 3A:
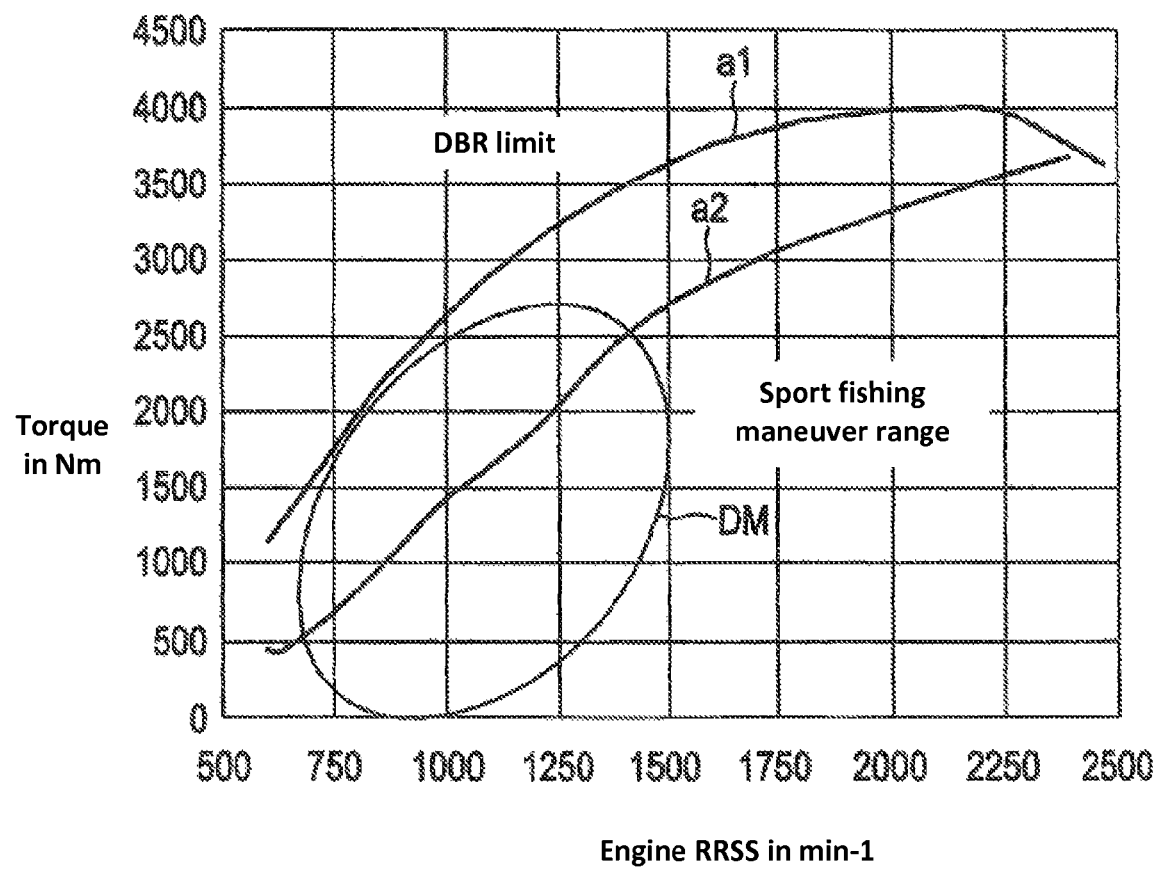
FIG. 3 shows an exemplary characteristic curve for the purpose of characterizing the operating range of an exemplary internal combustion engine in interval mode at a given engine rotation speed; view A shows a torque as a function of the engine rotation speed, while view B shows the engine rotation speed as a function of time—from which can be seen an exemplary clocking of time intervals in the interval mode.
Figure 3B:
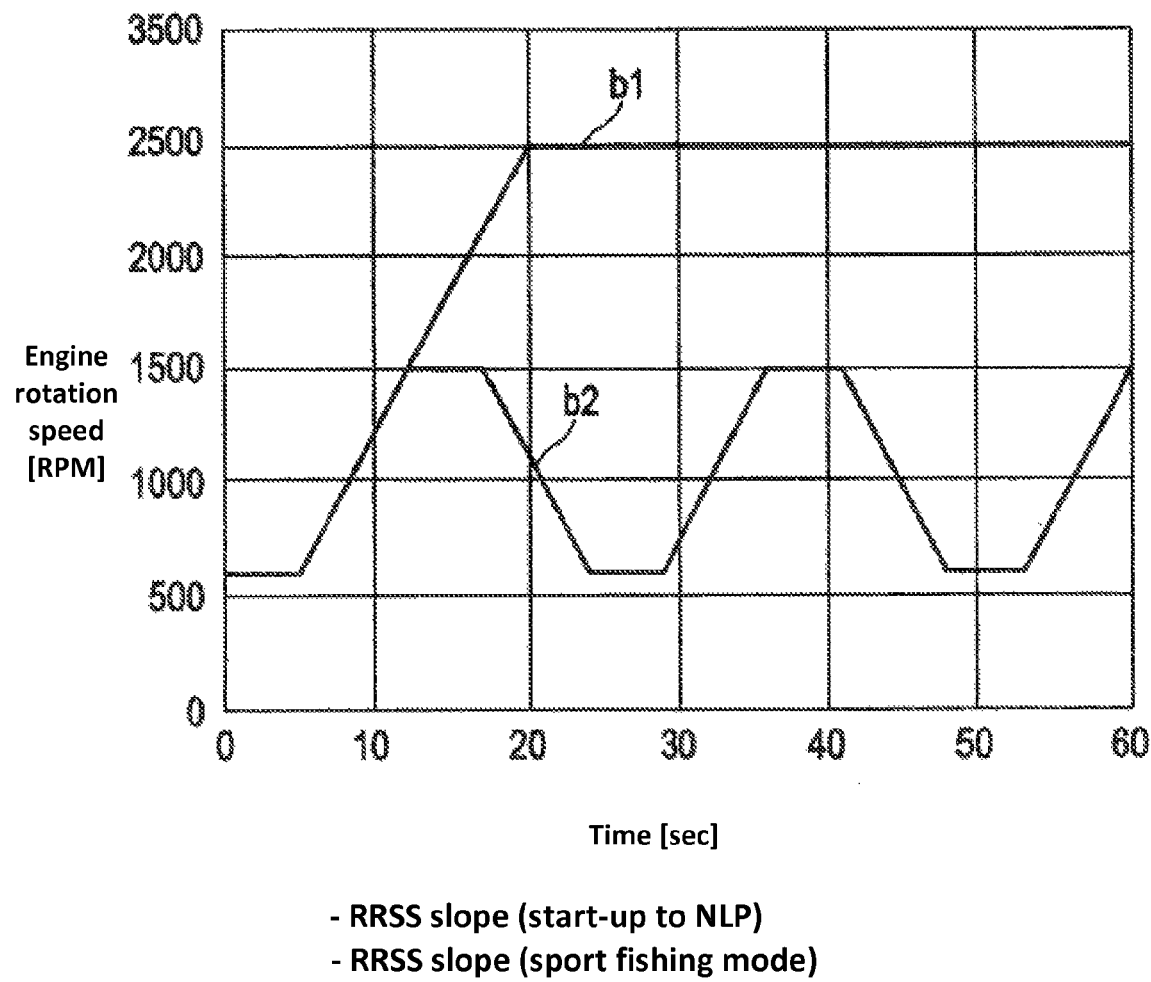

The available torque range in the interval mode is shown approximately in view A of FIG. 3—in region IM respective of characteristic curve a2. In interval mode IM, engine rotation speeds between approximately 700 to 1500 U/min, in the present, case can be achieved in a torque range significantly above 400 Nm up to 2700 Nm. The torques which can be achieved in this case are partly only slightly below the maximum torque determined by the rotation speed limit (characteristic curve a1).

In the present case, characteristic curve a2 in the region of the interval mode IM in this exemplary illustration also shows an essentially linear profile between an engine rotation speed of 700 U/min. at 500 Nm, and 1400 U/min. at 2500 Nm. The interval mode IM can also be expanded independently of this profile into a higher engine rotation speed range. The profile of the curve a2 in view A of FIG. 3 shoes this with a slightly different linear slope.

In the exemplary interval mode range IM, characteristic curve b2 in view B in FIG. 3 shows that the given torques can be achieved at the corresponding engine rotation speed with comparably steep slopes; in particular, in a time less than approximately 10 sec., it is possible to achieve an engine rotation speed between 500 and 1500 U/min, in order to output a torque of up to 2500 Nm. This comparably steep rotation speed slope is moreover already repeatable after less than 20 sec., as the profile of curve b2 in view B of FIG. 3 shows. This is made possible by the direct mechanical drive coupling between the electric machine 4 and the supercharger 3 according to the concept of the exemplary illustration, as explained by way of example in FIG. 1 and FIG. 2.

The corresponding interval mode IM may be suited for applications in watercraft for sport fishing or the like. In the present, concrete case, it is possible to increase the engine rotation speed within approximately 10 sec. from 500 to 1500 U/min, thereby achieving a torque of 2500 Nm from idle. This level can then, in the present case, be held for at least 10 sec. Afterward, the combustion engine 1 can drop back to idle operation at approximately 500 Nm and a rotation speed of approximately 500 U/min, and remain at idle for less than 10 sec. After this, another steep slope as described above can be traveled again over a time of only 10 sec., in order to operate the combustion engine 1 once more at a comparably high torque of 2500 Nm and 1500 U/min.

This periodic, clocked operation of the combustion engine 1 can be automated, and need not be controlled manually for each clock cycle. By way of example, the periodically clocked interval mode IM in the present case can be switched by a corresponding button in the watercraft dashboard. It can turn on automatically if, by way of example, the driver of the watercraft brings the speed into a certain range via a suitable positioning of a selection lever. The interval mode can also be set by throttling the charge air LL.

In sum, according to the concept of the exemplary illustrations, a direct drive of the supercharger 3 may be achieved via the electric machine 4, which is available spontaneously and with comparably high clock cycles. By means of the rotation speed of the turbine 42 of the turbocharger 40 which is increased via the supercharger 3, the combustion engine 1 receives a spontaneous acceleration which can be achieved with a targeted, high clock cycle. The operation of the combustion engine 1 in this case runs, optionally, close to the performance threshold if desired. The combustion engine 1 can be operated in a particularly advantageous manner at approximately 50% of the normal load or full-load torque and/or rotation speed specified by the rotation speed limit characteristic curve.

The invention claimed is:

1. A method operating a watercraft power supply or an internal combustion engine, comprising an exhaust end and a charger fluid end and a charger system including an exhaust gas turbocharger configured to charge the combustion engine, the exhaust gas turbocharger having a compressor arrangement on the charger fluid end and having a turbine arrangement on the exhaust end, a supercharger, a primary end of which is connected to the charger fluid end, and a secondary end of which is connected to the exhaust end, and an electric machine coupled to the internal combustion engine, wherein the supercharger is configured to be driven directly by the electric machine via a mechanical drive coupling:
wherein the method includes operating the engine in each of the following operating modes:
a starter mode, wherein the combustion engine is driven by the electric machine;
a generator mode, wherein the electric machine is driven by the combustion engine;
an electroboost mode, wherein the electric machine and the combustion engine drive a propeller;
a silent running mode, wherein only the electric machine drives the propeller while the combustion engine and the supercharger do not supply drive power to the propeller;
an interval mode wherein the combustion engine drives the propeller, and the electric machine drives the supercharger in repeating time intervals.

2. A method according to claim 1, wherein in the interval mode, the supercharger is driven by the electric machine, and the time intervals are greater than zero and less than 1 minute, and the propeller is driven at a rotation speed of the internal combustion engine in a rotation speed range above 500 RPM and up to 1600 RPM, and with a torque range between 500 Nm and 3000 Nm.

3. A method according to claim 2, wherein, in the interval mode, the internal combustion engine is operated during a time interval at a rotation speed between a lower rotation speed threshold and an upper rotation speed threshold, and the internal combustion engine is operated between a lower torque threshold and an upper torque threshold.

4. A method according to claim 3, wherein the lower rotation speed threshold is an idle speed of the internal combustion engine.

5. A method according to claim 1, wherein a supercharger drive is activated in the interval mode in response to at least one of:
an actuation of a mode button of the controller,
a measured deficiency of charge air, and
a speed selection.

6. An internal combustion engine having:
a combustion engine with an exhaust end and a charger fluid end and a charger system including:
an exhaust gas turbocharger configured to charge the combustion engine, the exhaust gas turbocharger having a compressor arrangement on the charger fluid end and having a turbine arrangement on the exhaust end,
a supercharger, a primary end of which is connected to the charger fluid end, and a secondary end of which is connected to the exhaust end, and
an electric machine configured to be a motor/generator, the electric machine coupled to the combustion engine, wherein the electric machine is configured to be driven by the combustion engine as a generator, or is configured to drive the combustion engine as a motor, and wherein the supercharger is configured to be driven directly by the electric machine via a mechanical drive coupling, wherein the mechanical drive coupling has a propeller gearing, wherein a drive shaft of the electric machine is coupled to the same on an input end thereof.

7. An internal combustion engine according to claim 6, wherein a drive shaft of a propeller and a crankshaft of the combustion engine are coupled to the propeller gearing on an output end.

8. An internal combustion engine according to claim 6, wherein the mechanical drive coupling, has one of a gearing and a mechanical compressor, wherein a drive shaft of the supercharger is coupled to the same on the output end thereof, and a drive shaft of the electric machine is coupled to the same on the input end thereof.

9. An internal combustion engine according to claim 6 wherein a drive shaft of a propeller is coupled to the propeller gearing on an output end thereof.

10. An internal combustion engine according to claim 6, wherein a drive shaft of the supercharger and a crankshaft of the combustion engine are coupled to a motor gearing on the output end.

11. An internal combustion engine according to claim 6, wherein, the electric machine is configured to be selectively driven as a motor and as a generator, wherein the electric machine is configured to function as one of a starter motor and an electric drive when driven as a motor, and wherein the electric machine is configured to carry out the function of a current generator for one of an on-board power supply and a battery when driven as a generator.

12. An internal combustion engine according to claim 6, wherein the supercharger is configured to be driven directly by the electric machine in chronologically bounded intervals of time.

13. An internal combustion engine according to claim 12, wherein the intervals of time are greater than zero and less than 1 minute.

14. An internal combustion engine according to claim 13, wherein the intervals of time are greater than zero and less than 30 seconds.

15. An internal combustion engine according to claim 6, wherein the engine is configured to be operated in at least one of a plurality of operating modes, the plurality of the operating modes including:
a starter mode, wherein the electric machine drives the combustion engine;
a generator mode, wherein the combustion engine drives the electric machine;
an electroboost mode, wherein the electric machine and the combustion engine drive a propeller; and a silent running mode, wherein only the electric machine drives the propeller while the combustion engine and the supercharger do not supply drive power to the propeller;

an interval mode, wherein the combustion engine drives the propeller, and the electric machine drives the supercharger in time intervals.

16. An internal combustion engine according to claim 6, wherein the supercharger is configured to be driven directly by the electric machine via a mechanical drive coupling, wherein a battery supplies power to the electric machine.

17. An internal combustion engine according to claim 6, wherein the secondary end of the supercharger is connected to the exhaust end upstream of the turbine assembly.

18. A watercraft having an internal combustion engine, comprising:

a combustion engine with an exhaust end and a charger fluid end and a charger system including:

an exhaust gas turbocharger configured to charge the combustion engine, the exhaust gas turbocharger having a compressor arrangement on the charger fluid end and having a turbine arrangement on the exhaust end, a supercharger, a primary end of which is connected to the charger fluid end, and a secondary end of which is connected to the exhaust end; and an electric machine configured to be a motor/generator, the electric machine coupled to the combustion engine, wherein the electric machine is configured to be driven by the combustion engine as a generator or is configured to drive the combustion engine as a motor, and wherein the supercharger is configured to be driven directly by the electric machine via a mechanical drive coupling;

wherein the engine is configured to be operated in an interval mode with repeating time intervals.

19. A watercraft according to claim 18, wherein a propeller of the watercraft is configured to be driven with at least one of:

(a) a rotation speed of the internal combustion engine in a rotation speed range above 500 RPM up to 1600 RPM, and (b) a torque in a torque range between 500 Nm and 3000 Nm, in a time interval which is less than 1 minute.

* * * * *